C. E. LYMAN.
ROAD SIGNAL.
APPLICATION FILED NOV. 12, 1915.

1,220,762.

Patented Mar. 27, 1917.

Witnesses:
C. Feinle, Jr.

Inventor:
C. E. Lyman.
By Victor J. Evans,
Attorney.

UNITED STATES PATENT OFFICE.

CHARLES E. LYMAN, OF ASHEVILLE, NORTH CAROLINA.

ROAD-SIGNAL.

1,220,762.  Specification of Letters Patent.  Patented Mar. 27, 1917.

Application filed November 12, 1915. Serial No. 61,151.

*To all whom it may concern:*

Be it known that I, CHARLES E. LYMAN, a citizen of the United States, residing at Asheville, in the county of Buncombe and State of North Carolina, have invented new and useful Improvements in Road-Signals, of which the following is a specification.

This invention is an improved automatic road signal for highways and other ways and for installation at a point near a curve or other dangerous portion of a road, to signal an automobile or other vehicle approaching said curve or other dangerous portion and thereby put the driver of the vehicle on guard and avoid accidents, the object of the invention being to provide an improved signaling mechanism of this kind which is extremely cheap and simple, which is strong and durable, is not likely to get out of order, may be readily installed and which will not be rendered inoperative by snow, mud, sand, or the like.

The invention consists in the construction, combination, and arrangement of devices hereinafter described and claimed.

Figure 1:
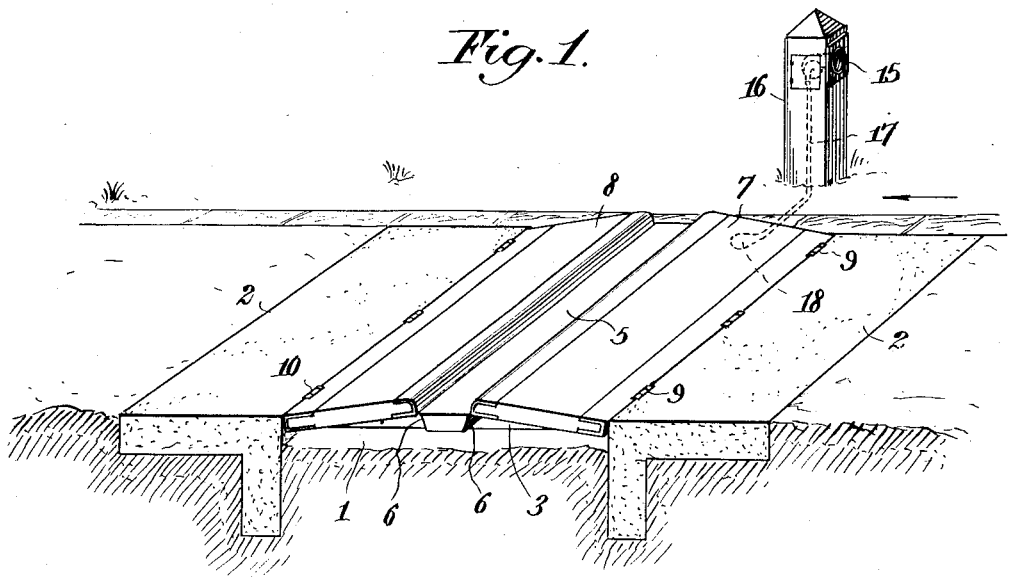
Figure 1 is a perspective view of a road signal constructed and arranged in accordance with my invention.
Figure 2:
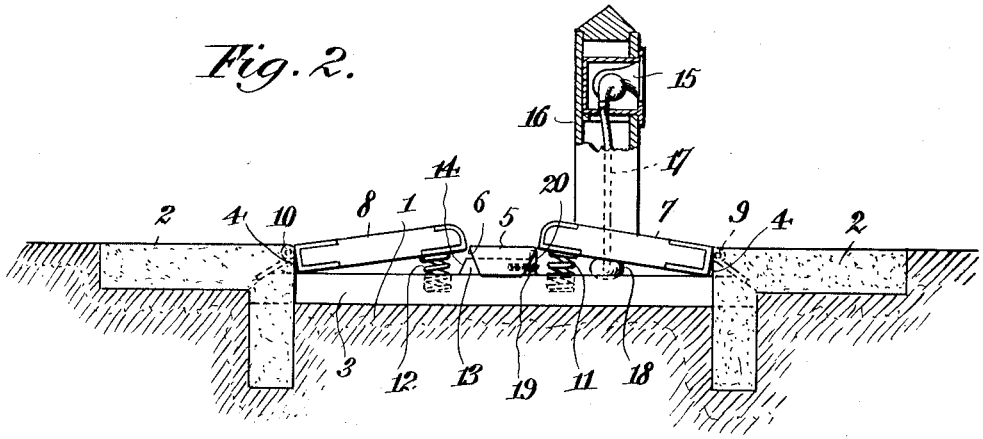
Fig. 2 is a detail side elevation of the same partly in section.

The supporting base 1 of my improved road signal is here shown as in the form of a box culvert extending across the road and comprising a pair of abutments 2 which may be made of wood, concrete, or other suitable material and which form a part of the road surface. The abutments are connected together by stringers 3, the upper sides of which are arranged below the upper surfaces of the abutments so that shoulders 4 are formed. A board 5 which forms a parting element is secured on the stringers at a point mid-way between the abutments and its side edges are beveled and undercut as at 6. A pair of treads 7, 8, which are here shown as boards, but which may, in practice be made of any suitable material, are arranged on the stringers, between the shoulders 4 and the beveled edges of the parting element and are respectively hinged at their outer sides to the abutments as at 9, 10, so that said treads are arranged for vertical angular movement. The tread 7 is farthest from the curve or other dangerous portion of the road and the first to be engaged by the wheels of a moving vehicle approaching said curve or other dangerous portion of the road and the said tread 7 is the signal operating tread. Springs 11 are employed to normally raise the free side of the tread 7 and cause the same to project above the parting strip or element 5 and springs 12 are employed to correspondingly operate the tread 8. Said tread 8 is for operating a locking device. The said locking device is here shown as a key 13 which is arranged in a horizontal guide way across the parting strip and presents a beveled cam end 14 next the tread 8.

The signaling device is here shown for the purposes of this specification as a horn 15 on a post 16 by the road side and connected by a tube 17 to a bulb 18, which bulb is arranged in a recess in one of the stringers and under the tread 7. In practice, any suitable signaling device may be used, such as a semaphore, an electric gong or the like, and a lever, circuit closer, or other signal controlling device may be arranged under the tread 7 for operation thereby instead of the bulb 18. A spring 19 is employed to move the key or locking member in one direction to project its cam end 14 in the path of movement of the free edge or side of the tread 8 and withdraw its opposite end 20 out of the path of the corresponding edge of the tread 7 and hence afford clearance for the latter.

The operation of the signaling apparatus is as follows. When a vehicle approaches the curve or other dangerous portion of the road, in the direction indicated by the arrow in Fig. 1, its wheels first pass over the tread 7 and depress said tread, causing said tread to squeeze the bulb 18 and hence sound the horn or to close an electric circuit or operate a signal controlling lever as the case may be and thereby indicate danger. As soon as the wheels pass over the tread 7, the springs 11 again raise the said tread and hold it in its normal elevated position. When a vehicle after having passed the curve or other dangerous place in the road from the opposite direction, approaches the signal apparatus, its wheels depress the tread 8, causing the free edge of said tread to engage the cam end 14 of the key 13 and move said key endwise to cause its end 20 to engage under the tread 7 and thereby prevent said tread 7 from being depressed and from operating the signal.

Owing to the provision of the under-cut beveled edges 6 of the parting strip, and the chamber formed under the treads and parting strip by the culvert or other base structure, snow, ice, mud, and the like, are cleared from between the opposing edges of the treads and parting strip and caused to drop into the culvert or chamber and prevented from interfering with the operation of the treads and the lock device for the signal operating tread.

The signal operating mechanism offers no obstruction to vehicles and foot passengers and appears as a part of the road surface and is adapted for use on roads of all kinds, whether narrow mountain wagon trails, automobile highways, city streets, or paved entrances, alleys, factories, mines, and the like. Counterweights, for raising the tread members may be employed instead of the springs, if desired.

While I have herein shown and described a preferred form of my invention, I would have it understood that changes may be made in the form, proportion, and construction of the several parts, without departing from the spirit of the invention, and within the scope of the appended claims.

Having described the invention, what is claimed is:

1. In apparatus of the class described, a parting element, treads on opposite sides of the parting element, means to normally raise the treads, a signaling element operated by one of the treads, and a locking device operated by the other tread to directly prevent the operation of the first named tread.

2. In apparatus of the class described, a support providing a space thereunder, a parting element on the center of the support and presenting undercut beveled side edges, treads mounted on said support on opposite sides of the parting element and for vertical movement, means to normally raise the treads, a signaling element operated by one of the treads, and means to lock said tread and hold the same in inoperative position, said locking means being operated by the other tread.

3. In apparatus of the class described, a support providing a space thereunder, a parting element on the center of the support and presenting undercut beveled side edges, treads mounted on said support on opposite sides of the parting element and for vertical movement, means to normally raise the treads, a signaling element operated by one of the treads, means to lock said tread and hold the same in inoperative position, said locking means being operated by the other tread, the said treads being pivotally connected at their outer sides to the support and said locking means comprising a key movable into and out of the path of the signaling device actuating tread and having a cam end movable into the path of the other tread, and means to normally hold the said locking means in the last named position.

4. In apparatus of the class described, a pair of abutments, stringers connecting the abutments and arranged below their upper surfaces to form shoulders, treads on said stringers and pivotally connected to said shoulders for vertical angular movement, a parting element secured on the stringers and between the treads and having undercut opposite edges, means to raise the treads, a signaling element operated by one of the treads, and a locking means for said tread arranged for operation by the other tread.

5. In apparatus of the class described, a pair of treads mounted for vertical movement, means to normally raise the treads, a signaling element operated by one of the treads and a locking device operated by the other tread to directly prevent the operation of the first named tread.

In testimony whereof I affix my signature in presence of two witnesses.

CHARLES E. LYMAN.

Witnesses:
ANNA MERCER,
PHILIP R. MOALE.